United States Patent [19]

Osman et al.

[11] 3,966,349
[45] June 29, 1976

[54] ROTATING CUTTER TOOL

[75] Inventors: Mohamed Osman; Bernd Greuner, both of Verden, Germany

[73] Assignee: Gebrueder Heller, Verden, Germany

[22] Filed: Mar. 31, 1975

[21] Appl. No.: 563,523

[30] Foreign Application Priority Data
Apr. 3, 1974 Germany............................ 2416157

[52] U.S. Cl............................... 408/204; 408/227; 408/703
[51] Int. Cl.²..................... B23B 41/02; B23B 51/04
[58] Field of Search .......... 408/204, 205, 206, 703, 408/227, 211

[56] References Cited
UNITED STATES PATENTS
2,942,501  6/1960  Kallio................................ 408/206
3,014,386  12/1961  Kallio................................ 408/211

FOREIGN PATENTS OR APPLICATIONS
751,130  1/1967  Canada............................. 408/211
914,573  1/1963  United Kingdom................ 408/204

*Primary Examiner*—Travis S. McGehee
*Attorney, Agent, or Firm*—Eugene J. Kalil; Francis J. Murphy

[57] ABSTRACT

Uneven wear of the cutting edges of rotating trepanning or drilling tools is avoided by employing at least two cutting blades, by providing a single support strip embedded in an elastically pliable material, and by arranging the cutting blades such, that the resultant force of the cutting forces produced during the drilling operation is directed to the support strip and is of a magnitude such that the lubricant film bracing said strip against the borehole wall does not break away.

7 Claims, 4 Drawing Figures

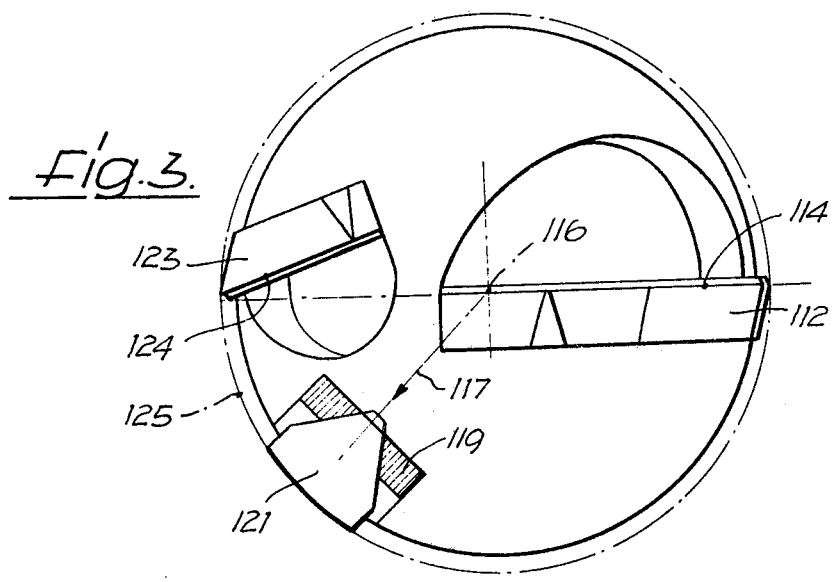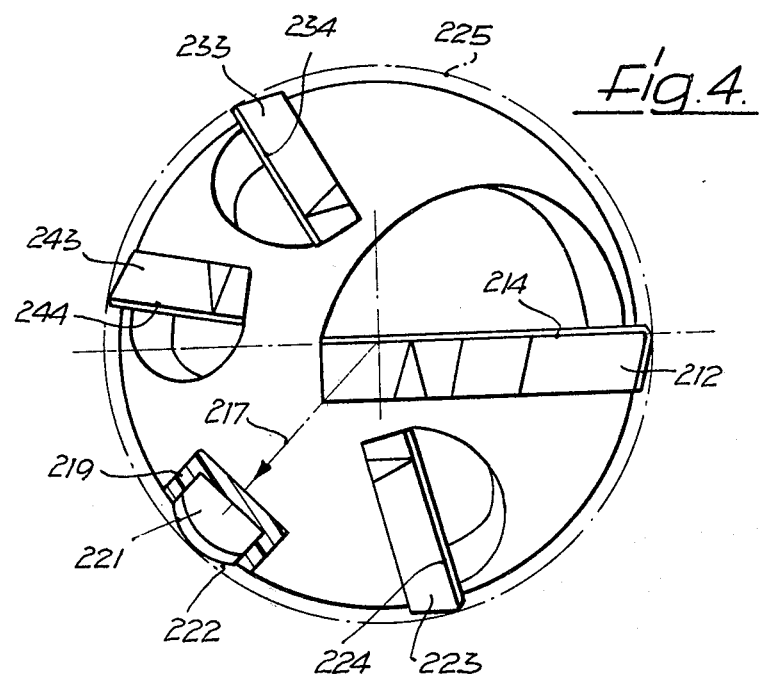

ROTATING CUTTER TOOL

BACKGROUND OF THE INVENTION

1. Field of the invention

This invention relates to improvements in rotating cutter tools for making holes by trepanning or by drilling.

2. Description of the prior art

Conventional cutter tools of this kind comprise cutting blades and support strips forming support surfaces for defining slots for lubricant films between the support surfaces and the wall of the hole made. Rotating cutter tools of this type are employed in deep-well drilling, i.e., drilling at a depth greater than three times the diameter of the bore. The support surfaces serve to avoid lateral movement of the tool away from the axis of the bore during drilling. At least two support surfaces are formed by support strips in prior art cutter tools of this kind. Uneven wearing of these support strips and of the cutting edges cannot be avoided for conventional tools; this in turn, leads to a tendency of the tool toward lateral movement, a shorter life, and development of vibrations during drilling. This results in bores out of round having wavy bore surfaces for which exact tolerances cannot be maintained.

It is the purpose of the present invention to obviate the aforementioned difficulties by providing a rotating cutter tool having at least two cutting blades and at least three support surfaces with which round, smooth bore holes can be drilled with extremely small tolerances.

SUMMARY

The preferred embodiment of the present invention solves the problem inherent in cutter tools of the type referred to in the beginning, by providing a single support strip and arranging the cutting blades such that the resultant force of the cutting forces produced by the cutting edges during the cutting operation is directed to the support strip and has such a magnitude that a lubricant film in the slot formed between support surface and the wall of the bore hole supports said support surface of the support strip without breaking away. By applying known theories and an evaluation of the results of practical experiments, it is possible to ascertain the magnitude and the direction of the cutting forces of the individual cutting edges effective during drilling. Furthermore known are also those forces which can be supported by the lubricant film of a single support surface at different speeds of rotation of cutter tools, without breaking away. The prior art thus provides a person skilled in the art with the means for applying the teaching of the present invention and for arranging the cutting blades of a rotating cutter tool such that the resultant of the cutting forces produced at the cutting edges during drilling has a magnitude other than O, but which is still so small that it can be braced by the lubricant film of a single support surface without breaking away. In determining the magnitude and direction of the resultant cutting power, that location of the single support strip can be determined precisely at which the resultant of the cutting forces is entirely absorbed by the lubricant film at the support surface formed by the support strip. This in turn considerably increases the useful life of the one support strip for drills used constructed in accordance with the present invention. Prolonged life of the support strip leads to an increase of the useful life of the cutter tool itself. Precise guidance of the drill by means of the support strip enables maintaining precision during drilling within a range of but a few hundred parts of a millimeter and enables keeping ripples within a range of up to 20 micrometers. Also avoided is a lateral displacement of the bore hole.

In order to nevertheless ensure that, in the case of a possible, minutely uneven wear of the cutting edges and an alteration of the resultant of the cutting forces connected therewith, this resultant is correctly braced by the single support strip at the borehole wall through the lubricant film, one advantageous embodiment of the present invention provides that the support strip is connected to the tool body by a bedding of an elastically pliable damping material. This permits the support strip to always adjust to the new direction of the resultant.

Still further embodiments and advantages of the present invention will readily occur to one skilled in the art to which the invention pertains, upon reference to the following detailed description.

DESCRIPTION OF THE DRAWINGS

The description refers to the accompanying drawings in which like reference characters refer to like parts throughout the several views and in which:

FIGS. 3 and 4 show views similar to that of FIG. 1 for a second and third embodiment of the invention, illustrating a drill for coreless drilling.

DESCRIPTION OF THE PREFERRED EMBODIMENTS

Figure 1:
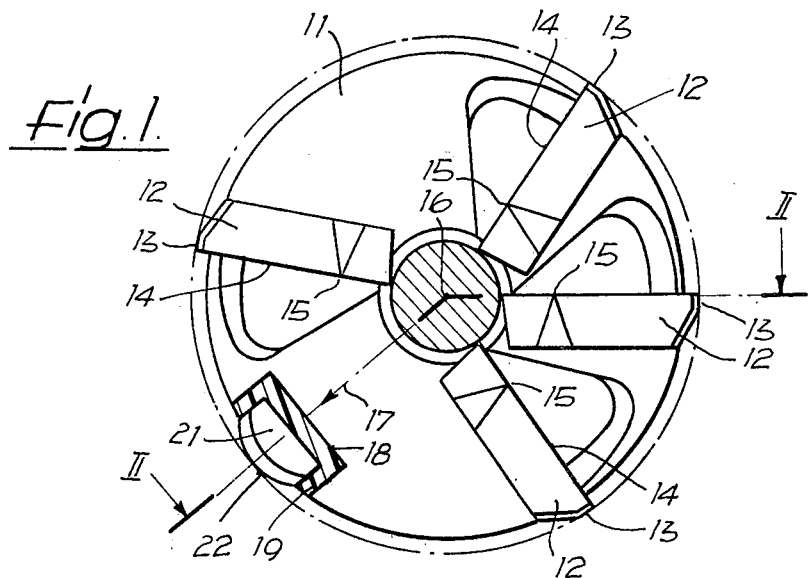
FIG. 1 is a front view of a first embodiment of a trepanning cutter tool.
Figure 2:
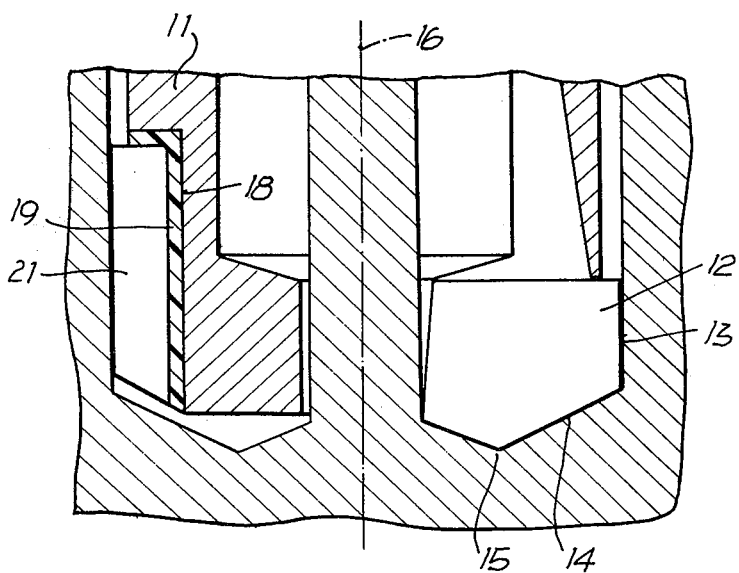
FIG. 2 is a cross-section along the line II—II of the trepanning tool of FIG. 1 and the hole drilled thereby.

Now referring to the drawings, the invention is described with reference to a core drill or borer as illustrated in FIGS. 1 and 2, having four cutting blades 12 in a tool body 11, whereby the radially outer edge surfaces of the cutting blades form support surfaces 13, and the cutting edges 14 of said blades extend across the entire area that is to be machined round a core. Each cutting edge 14 forms an obtuse angle, the vertex of which forming a point 15 aimed in the drilling direction of the drill. All points 15 of all cutting edges 14 are located at the same radial distances from the tool axis 16. The construction of the cutting edges 14, as just described, produces advantageous centering of the drilling tool.

The direction of the resultant cutting forces of the blades 12 is indicated by an arrow 17 in FIG. 1. A support strip 21, placed in the direction of the arrow 17 in an axial groove 18 of the tool body 11, has a floating support of an elastically pliable damping material 19 of cast iron, bronze, Nylon, or something similar.

The cutting blades 12 are arranged such, that the resultant cutting force of their edges 14 is indeed greater than zero but nevertheless still so small that the lubricant film formed between the support surface 22 of the support strip 21 and the wall of the drilled bore, is able to transfer this cutting force to the wall of the hole without breaking away.

Because the lubricant film at the support strip 21 does not break away during drilling, due to the specific arrangement of the cutting blades 12 precisely calculated beforehand, the useful life achieved for the support strip 21 and thus also for the entire drill is long.

Due to the accurate guidance as a result of the support strip 21, the cutting edges 14 of the cutting blades 12 are worn off evenly, which also contributes toward increasing the useful life of the drill. In the event that the blades 14 nevertheless should wear off slightly inevenly, thereby changing the direction of the resultant cutting force, the support strip 21 can readily adapt itself to the altered direction of the resultant, because its support is of the elastically pliable damping material 19, which guarantees that the resultant cutting force is well braced by the support strip 21 through the lubricant film against the borehole wall.

In the case of the embodiment represented in FIG. 3, those parts which correspond to parts already shown in the embodiment of FIGS. 1 and 2, were assigned the same reference characters to which the number 100 has been added, so that it suffices for explanations thereof to refer to the first embodiment as illustrated in FIGS. 1 and 2.

FIG. 3 represents a drill for coreless drilling, provided with only a single cutting blade 112, its cutting edge 114 extending across more than the radius of the entire area that is to be machined. In addition to the cutting blade 112, a further cutting blade 123 is provided, its cutting edge 124 extending along one part of a chord of its circumference 125 of rotation, being thus essentially shorter than the cutting edge 114 of the cutting blade 112. This results also in the fact that the cutting edge 124 is not directed toward the axis 116 of the drilling tool and thus forms an acute angle wth the corresponding radial plane of the drill. This arrangement of the cutting blade 123 permits advance determination of the desired direction and magnitude of the resultant of the cutting force of cutting edges 114 and 124. A support strip 121 is arranged for swinging about an axial groove in an elastically pliable damping material 119. The second embodiment, as represented in FIG. 3, has the advantage with respect to this first example, that adjacent the outer circumference of the drill, where the peripheral speed is greater and thus the cutting edges more strongly worn, occupation by cutting edges, namely the two edges 114 and 124, is greater than in the central area in which only a single cutting edge is located, namely the edge 114. This results in the fact that where the velocity of the cutting edge is greater, thus subjecting the edges to greater wear, more cutting edges are available, thereby correspondingly reducing wear and tear of the edges at those particular locations. This has the effect of a more even wear of the cutting edges and thus increases the useful of the drilling tool.

Those parts of FIG. 4 corresponding to those already shown in the example illustrated in FIG. 3, were assigned the same reference characters to which the number 200 was added so that it should suffice for explanations thereof to refer to the second example.

The third embodiment as illustrated in FIG. 4, also pertains to a drill for coreless drilling, as does the second example represented by FIG. 3, having only a single cutting blade 212, its cutting edge 214 extending across more than the radius of the entire area that is to be machined. In addition to cutting blade 212, three further cutting blades 223, 233 and 243 are provided, having cutting edges 224, 234 and 244 respectively. All blades form angles with each other different from 0° and 180°, and they extend only across the outer portion of a radius of their circumference 225 of rotation. The single support strip 221 also has a floating support of an elastically pliable damping material 219, as was the case for the first embodiment illustrated in FIGS. 1 and 2.

In the third example, particular care was taken that the areas to be machined by cutting edges having a greater peripheral speed, are occupied by more cutting edges than the areas to be machined by cutting edges having smaller peripheral speeds, whereby the number of cutting edges is continuously reduced toward the center.

Also in the case of this embodiment, the cutting edges 214, 224, 234, 244 are arranged such, that the resultant of their cutting forces is indeed not equal to zero but still so small that it can be braced by the wall of the drilled bore through the lubricating film of the support surface 222 of the support strip 221 without breaking away, whereby the support strip 221 is located in the direction of this resultant, as indicated by an arrow 217.

Although the invention has been illustrated and described with reference to the preferred embodiments thereof, we wish to have it understood that it is in no way limited to the details of such embodiments, but is capable of numerous modifications within the scope of the appended claims.

What is claimed is:

1. A cutter tool for making a hole by rotation about an axis comprising a tool body, at least two cutting blades with cutting edges angled with respect to each other, and a support strip, said cutting blades and said support strip forming a support surface defining a slot for a lubricant film between said support surface and the wall of said hole, so that said support surface is supported on said wall of said hole by said film during the cutting operation, wherein said cutting blades are arranged such that, the resultant reaction force generated by the cutting forces produced by said cutting edges during the cutting operation is directed toward said support strip and has such a magnitude, such that said lubricant film supports said support surface of said support strip without breaking away.

2. A cutter tool as defined in claim 1, wherein the support strip is connected to said tool body by a bedding of an elastically pliable damping material.

3. A cutter tool as defined in claim 1 for trepanning, wherein at least one of said cutting edges extends across the entire area that is to be machined.

4. A cutter tool as defined in claim 1, wherein said cutting edges of said cutting blades are of different lengths.

5. A cutter tool as defined in claim 1, wherein one of said cutting edges has a first length which extends at least across the radius of the area to be machined, and another of said cutting edges has a second length shorter than said first length and extending only across the radially outer portion of the area that is to be machined.

6. A cutter tool as defined in claim 5, wherein said shorter cutting edge extends along one part of a chord of its circumference of rotation.

7. A cutter tool as defined in claim 5 including at least one additional cutting edge of shorter length than said first length said additional cutting edge having a length different than said second length.

* * * * *